3,345,310
PHOSPHORUS-CONTAINING COMPOSITIONS AND USE THEREOF IN THE PREPARATION OF POLYURETHANE FOAMS AND COATINGS

Karl Brack, Wilmington, Del., assignor to Hercules Incorporated, a corporation of Delaware
No Drawing. Filed May 18, 1964, Ser. No. 368,420
7 Claims. (Cl. 260—2.5)

This invention relates to novel phosphorus-containing compositions useful in the preparation of flame-retardant polyurethane foams and coatings, to methods of preparing such compositions, and to their use in polyurethane foams and coatings.

A principal object of the invention is the provision of phosphorus-containing compositions which are useful in the preparation of polyurethane foams and coatings and which add flame-retardant properties, as well as other desirable properties, to such foams and coatings.

Another object of the invention is the provision of a phosphorus-containing composition which when caused to react with a polyisocyanate, e.g., toluene diisocyanate, produces flame-retardant, self-extinguishing polyurethane coatings.

Still another object of the invention is the provision of a composition which can be used to replace a part or all of the polyol in the production of flame-retardant and self-extinguishing polyurethane foams.

It has been found that the above and other objects can be obtained by the provision of compositions prepared by (1) reacting a material selected from the group consisting of (a) a substantially petroleum hydrocarbon-insoluble pine wood resin and (b) a hydroxyalkylated substantially petroleum hydrocarbon-insoluble pine wood resin, with a phosphorus-containing compound selected from the group consisting of (c) pyrophosphoric acid, (d) polyphosphoric acid and (e) phosphoric anhydride (phosphorus pentoxide—$P_2O_5$), at temperatures from about 80° to about 200° C. for a period of time from about one-half hour to about twelve hours, and (2) reacting the resulting product with an epoxide having the formula

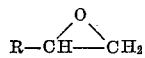

where R is selected from the group consisting of hydrogen (—H), alkyl, e.g., —$CH_3$, chloroalkyl, e.g., —$CH_2Cl$, aryl, chloroaryl, bromoalkyl and bromoaryl at temperatures from about 20° C. to about 200° C. and for a period of time from about 1 hour to about 10 hours until the product is practically neutral. The products obtained have been found to be particularly useful in the manufacture of flame-retardant polyurethane coatings and foams.

The substantially petroleum hydrocarbon-insoluble pine wood resin contemplated for use herein can be prepared, for example, in accordance with the processes of U.S. patents to Hall, Nos. 2,193,026 and 2,221,540, or equivalent processes which separate the petroleum hydrocarbon-insoluble pine wood resin from the rosin. This material, which is characterized herein by the term "substantially petroleum hydrocarbon-insoluble pine wood resin," is the resinous material which can be prepared from pine wood as follows: The pine wood, which may or may not have been steamed to remove volatile constituents such as turpentine and pine oil, may be extracted with a coal tar hydrocarbon such as benzol or toluol, or other suitable extraction solvent, and the extract then freed of volatile constituents, leaving a residue consisting of a mixture of wood rosin and the resin used in the present composition. Extraction of this mixture with a petroleum hydrocarbon such as, for example, gasoline, dissolves and removes the rosin. After separation of the rosin, high in abietic acid, a resinous residue remains which is low in abietic acid. Alternatively, the material obtained on evaporation of the coal tar hydrocarbon extract may be dissolved in a mixture of furfural and a petroleum hydrocarbon such as gasoline, and the two layers which form separated, in which case the substantially petroleum hydrocarbon-insoluble resin is found dissolved in the furfural phase from which it may be obtained by evaporation of the furfural. Other methods of isolating the desired petroleum hydrocarbon-insoluble pine wood resin may be employed, if desired.

This resin, used in accordance with the present invention, is characterized by a dark red brown color, cherry red in solution, and by substantial insolubility in petroleum hydrocarbons, but it will vary somewhat in its specific characteristics such as acid number, melting point, exact petroleum ether solubility, and content of naphtha- and toluol-insoluble material, depending upon the details of the extraction processes utilized. This resin will meet or nearly meet the following specifications, namely, substantial insolubility in petroleum hydrocarbons, substantially complete solubility in alcohol, a methoxy content from about 3% to about 7.5% (usually from about 4% to about 6%), an acid number in the range from about 80 to about 110, and a drop melting point in the range from about 100° C. to about 140° C. as determined by the Hercules drop method for determining the softening point of rosins and stabilized resins. This resin is a solid material of phenolic character and comes into commerce in the pulverized or ground form, as well as in lump or aqueous emulsion form.

By chemical analysis, a typical sample of the substantially petroleum hydrocarbon-insoluble pine wood resin, prepared as hereinabove described, was found to have an average molecular weight of ca. 450, an acid number of ca. 95, and an active hydrogen content, calculated as hydroxyl and corrected for acid number, of ca. 5–6%. From these values, it is calculated that there are on the average ca. 1.5 moles of alcoholic and phenolic hydroxyl groups and ca. 0.8 mole of carboxylic acid group per mole of resin based on an average molecular weight of the resin of ca. 450.

The hydroxyalkylated petroleum hydrocarbon-insoluble pine wood resin contemplated for use herein can be prepared by reacting the substantially petroleum hydrocarbon-insoluble pine wood resin described above with an epoxide with or without a catalyst, e.g., an alkaline material such as sodium methylate, sodium hydroxide, and so on, disclosed in U.S. 2,555,901. By this reaction the carboxylic acid groups and some of the phenolic hydroxyl groups are converted respectively to hydroxyalkyl esters and hydroxyalkyl phenyl ethers in which the alkyl groups contain from about 2 to about 8 carbon atoms. Typical reactions are illustrated by the following equations:

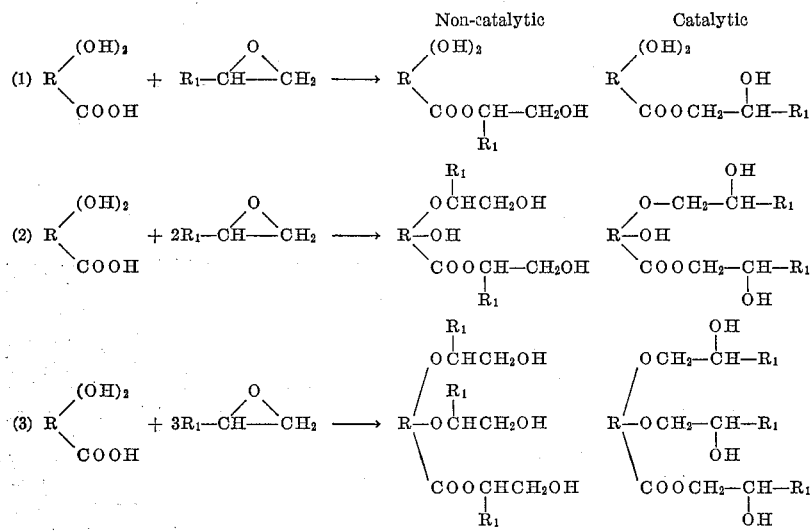

where R is the nucleus of the substantially petroleum hydrocarbon-insoluble pine wood resin molecule and $R_1$ is selected from the group consisting of hydrogen, alkyl, aryl, chloroalkyl, chloroaryl, bromoalkyl and bromoaryl.

As will be evident, the use of a catalyst has some influence on the types of products obtained. Thus, for example, if propylene oxide is used with an alkaline catalyst, the 2-hydroxy, 2-methyl ethyl esters will predominate. If a catalyst is not used, the 1-methyl, 2-hydroxy ethyl esters will dominate. The noncatalytic reaction is preferred where it is desired to eliminate, or at least minimize, the possibility of polymerization of the epoxide due to the alkaline catalyst.

The above reaction is advantageously carried out in an autoclave at temperatures of 20–200° C., preferably 130–160° C., and pressures from about 10 p.s.i. to about 350 p.s.i., and times from about 1 hour to about 10 hours, utilizing a solvent such as benzene, toluene, chlorobenzene or the like. The reaction is terminated after no further absorption of epoxide takes place, as indicated by constant pressure, after which any excess epoxide and solvent are removed under reduced pressure. The amount of epoxide utilized can vary from about 1 mole to about 5 moles per mole of substantially petroleum hydrocarbon-insoluble pine wood resin based on an average molecular weight of the resin of about 450. Typical epoxides which can be used are ethylene oxide, propylene oxide, epichlorohydrin, styrene oxide, 2-butene oxide, isobutylene oxide, cyclohexene oxide, tetramethyl ethylene oxide, 1,2-epoxybutane, butadiene monoxide and piperylene monoxide. The preferred epoxides are ethylene oxide and propylene oxide which result in the formation of hydroxyethyl and/or hydroxypropyl groups on the resin.

In preparing the novel products of this invention from the substantially petroleum hydrocarbon-insoluble pine wood resin, such resin is first treated with a phosphorylating agent selected from the group consisting of phosphoric anhydride, pyrophosphoric acid and polyphosphoric acid. During this treatment the phosphorylating agent reacts with the alcoholic and phenolic hydroxyl groups of the resin to form phosphate esters. The reactions with pyrophosphoric and polyphosphoric acids yield mostly primary esters with phosphoric acid as a by-product. The reaction with phosphoric anhydride yields a mixture of primary and secondary esters but does not create any by-product phosphoric acid when used in the right ratio. Various side reactions, e.g., some dehydration of secondary or tertiary hydroxyls as well as some decarboxylation are also possible at higher temperatures. Moreover, since a considerable number of the compounds, e.g., about 50%, which make up the substantially petroleum hydrocarbon-insoluble pine wood resins utilized herein do not have any hydroxyl groups or have hydroxyl groups which are sterically hindered, it has been found that at best, ca. 50% of the resin will react in the above reactions. If desired, any unreacted resin can easily be removed after the phosphorylation by extraction with benzene, toluene, chlorobenzene, etc., and any excess phosphoric anhydride or phosphoric acid can be removed by water-washing.

The treatment with phosphorylating agents can be carried out at temperature from about 80° C. to about 200° C. Temperatures in the lower portion of this range will generally give satisfactory reaction rates when phosphoric anhydride is used. The less reactive pyrophosphoric and polyphosphoric acids require somewhat higher temperatures for comparable reaction rates. The preferred temperature ranges are from about 80° C. to about 120° C. for the phosphoric anhydride and from about 140° C. to about 160° C. for the pyrophosphoric and polyphosphoric acids. The time of reaction can vary from about one-half hour to about twelve hours, depending on the particular phosphorylating agent, temperature, and so on.

The ratio of substantially petroleum hydrocarbon-insoluble pine wood resin to phosphorylating agent can be varied within wide limits and depends on factors such as the particular phosphorylating agent used, the desired phosphorus content in the product, whether unreacted resin and/or phosphorylating agent can be tolerated in the product, whether a water-wash to remove the excess phosphorylating agent is economically feasible, and so on. In the case of phosphoric anhydride, if the ratio of resin to anhydride is high, i.e., if only ca. 10% or less anhydride is used, based on resin, then practically all the anhydride is used up and extraction, e.g., with toluene, after the reaction, will leave practically pure petroleum hydrocarbon-insoluble pine wood resin phosphate. If a higher percentage of anhydride is used, a slightly higher percentage of the resin is phosphorylated but also some anhydride remains unreacted. Therefore, besides the toluene extraction, a washing with water becomes necessary to obtain a pure resin phosphate.

In the case of polyphosphoric acid, only a small amount of phosphoric acid is formed during the reaction. For most applications, this can be left in the product without detrimental effects. The same considerations apply with respect to ratios of resin to polyphosphoric acid as outlined above for phosphoric anhydride.

In the case of pyrophosphoric acid, one mole of phosphoric acid is formed for each mole of pyrophosphoric acid reacted. This makes water-washing of the product highly desirable if not necessary. Because of this, there is nothing to be gained by using an excess of the resin rather than an excess of pyrophosphoric acid in the reaction.

In general, in view of the above considerations, the ratio of resin to phosphorylating agent can vary from about 20:1 to about 2:1. Preferred ratios are from about 13:1 to about 5:1.

It was explained above that under certain circumstances there will be unreacted phosphoric anhydride in the product and that by necessity there is phosphoric acid formed as a by-product in the reactions involving pyro- and/or poly-phosphoric acid. It was also mentioned that these by-products can easily be removed by water-washing. However, depending on the uses for the ultimate product, these by-products may not have to be removed. If they are kept in the reaction mixture, they will be converted mostly into tri(hydroxyalkyl)phosphate during the subsequent treatment with epoxide described hereinafter. Phosphoric anhydride also will react during this subsequent epoxide treatment. Thus, the hydroxyl groups formed during the hydroxyalkylation will react with the phosphoric anhydride as described above and the free phosphoric acid groups so formed will then also become hydroxyalkylated. If the final product is to be used in the preparation of flameproof urethane foams, it will actually be helpful to leave these products in the reaction mixture, because (1) they will contribute a higher phosphorus content to the product, (2) they will make the final product somewhat more fluid, and finally, (3) they will raise the hydroxyl number of the final product. On the other hand, urethane foams containing a large amount of these hydroxyalkylated phosphate type by-products may be slightly more sensitive to moisture. Therefore, where moisture resistance is important, these by-products should be limited to an amount which will not adversely affect the moisture sensitivity of the foam.

The phosphorylated resin, produced as above described, is next reacted with an epoxide and a mixture of polyols is produced. This reaction can be carried out in the same manner and under the same conditions previously described herein for hydroxyalkylating the substantially petroleum hydrocarbon-insoluble pine wood resin. A catalyst is not necessary but can be used, if desired. During this reaction the acids in the resin, including phosphoric acids as well as carboxylic acids, are converted to hydroxyalkyl esters. The following is typical of the reactions which take place:

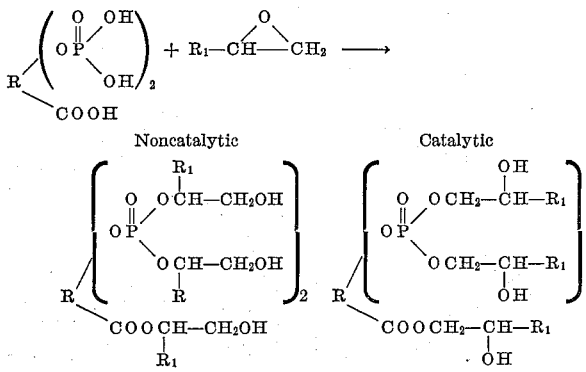

where R is the resin nucleus and $R_1$ is the same as before.

The reaction with epoxide is carried out in solvents such as benzene, toluene, chlorobenzene, etc., and is continued until the resulting product is practically neutral or until no further absorption of epoxide takes place, as indicated by constant pressure. This will usually require an amount of epoxide in excess of that theoretically required to produce a neutral product. The reaction is then terminated after which the excess epoxide and solvent are removed under reduced pressure. The product, which is taken as a residue, is a brown resinous oil which can easily be mixed with conventional polyols.

In the alternative method for preparation of the products of the invention, the substantially petroleum hydrocarbon-insoluble pine wood resin is first hydroxyalkylated by reaction with an epoxide as hereinbefore described. The hydroxyalkylated substantially petroleum hydrocarbon-insoluble pine wood resin is then reacted with a phosphorylating agent. This step is carried out in the same manner as the corresponding step in the first described procedure, the essential difference in the reactions being that the phosphorylating agent reacts at random with the newly created hydroxyl groups of the hydroxyalkylated substantially petroleum hydrocarbon-insoluble pine wood resin and with the residual hydroxyl groups originally present in the resin.

Following phosphorylation, the product is again reacted with epoxide, as set out in the first described procedure, until practically neutral. The product, recovered as before, is a heavy oil.

The second described procedure wherein the substantially petroleum hydrocarbon-insoluble pine wood resin is first hydroxyalkylated is advantageous in that all of the petroleum hydrocarbon-insoluble pine wood resin is utilized and that higher phosphorus concentrations can be obtained since more hydroxyl groups are available for reaction.

In a further modified procedure, additional hydroxyl functionality and phosphorus content can be obtained if the substantially petroleum hydrocarbon-insoluble pine wood resin is first reacted with hydrogen peroxide in the presence of a strong acid catalyst such as formic acid, sulfuric acid or phosphoric acid to add hydroxyl groups on carbon atoms connected by double bonds.

The hydroxyalkylated phosphorylated substantially petroleum hydrocarbon-insoluble pine wood resins, obtained as hereinabove described, are dark, heavy oils with acid numbers from 0 to about 50, hydroxyl numbers from about 100 to about 300 and a phosphorus content from about 2% to about 12%. These values depend, of course, on the amounts of substantially petroleum hydrocarbon-insoluble pine wood resin, phosphorylating agent and epoxide used in the reaction. In general while a phosphorus content as low as 1% will give some flame-retardant properties, it will usually be desirable to have at least about 3% and up to about 10%.

These products can be used in admixture with a polyol in the reaction with a polyisocyanate to produce a polyurethane. The polyols which are so used are polyether alcohols and/or polyester alcohols. The former are hydroxyalkoxy alcohols such as alkylene oxide reaction products of a compound having an active hydrogen. In this group are the polyols or mixtures of polyols known to be useful for the preparation of rigid polyurethane foams and having hydroxyl numbers of at least about 300. Thus, there can be used (1) polyols of the polyether class such as addition products of polyhydric alcohols and alkylene oxides, e.g., polyols obtained by the reaction of propylene oxide with sorbitol, mannitol, glycerol, glucose, sucrose, pentaerythritol, trimethylolpropane, trimethylolbutane, methyl-α-D-glucoside, 1,2,6-hexanetriol, 1,2,4-butanetriol and the like in mole ratios of the former to the latter from about 3:1 to about 15:1; (2) polyols of the polyester class such as formed from polyhydric alcohols and dicarboxylic acids, e.g., mixed polyesters of ethylene glycol, and glycerol, in which glycol is in excess so as to have alcohol terminal groups; (3) diethylene glycol, hexylene glycol, dipropylene glycol; and (4) polyols of the polyether class which are alkylene oxide reaction products of amines such as ammonia, ethylene diamine, toluene diamine, and triethylene diamine, particularly wherein the alkylene oxide is propylene oxide.

The polyols used in the polyurethane formation will have hydroxyl numbers in the range of about 40 to about 650, depending on the rigidity desired in the foam. A hydroxyl number of 40–75 is preferred for a flexible foam, a hydroxyl number of 150–250 is preferred for a semi-rigid foam, and a hydroxyl number of 300–650 is preferred for a rigid foam. The compressive strength for flexible foam is less than about 1 p.s.i. (2 lb./cu. ft. density), for semi-rigid foam, 5–30 p.s.i. (2 lb./cu. ft. density), and for rigid foam 20–40 p.s.i. (2 lb./cu. ft. density). The hydroxyl number is the number of mg. of KOH required to neutralize the acid required to esterify one gram of sample.

The preferred polyether alcohols used with the hydroxyalkylated phosphorylated petroleum hydrocarbon-insoluble pine wood resin in this invention are: sorbitol—propylene oxide adduct (1:10), pentaerythritol—propylene oxide adduct (1:4.5) and sucrose—propylene oxide adduct (1:14).

The ratio of hydroxyalkylated phosphorylated petroleum hydrocarbon-insoluble pine wood resin to polyol used in the preparation of foams in accordance with the invention will be determined by the equivalent weight. The equivalent weight needed to get a good rigid polyurethane foam is about 100 to 180 average for the total alcohol mixture (combined polyol and hydroxyalkylated phosphorylated petroleum hydrocarbon-insoluble pine wood resin) used. The equivalent weight of the alcohol mixture is determined by the equation:

$$\text{Equivalent weight} = \frac{56,100}{\text{hydroxyl no.} + \text{acid no.}}$$

Since the hydroxyl number of the hydroxyalkylated phosphorylated petroleum hydrocarbon-insoluble pine wood resin is about 100–300 and the acid number is 0 to 50, a polyol with a high hydroxyl number is needed to reach the desired equivalent weight. In the case of a mixture of hydroxyalkylated phosphorylated petroleum hydrocarbon-insoluble pine wood resin and polyol, the equivalent weight is determined from the hydroxyl number and acid number of the mixture.

The polyisocyanates that may be used are any organic polyisocyanate such as aliphatic, aromatic (arylene) or cycloaliphatic organic polyisocyanate or mixture thereof, such as the isomeric mixtures normally resulting from their production, and especially the hydrocarbon and halohydrocarbon polyisocyanates including ethylene diisocyanate, trimethyl diisocyanate, tetramethylene diisocyanate, hexamethylene diisocyanate, decamethylene diisocyanate, p-phenylene diisocyanate, m-phenylene diisocyanate, naphthalene diisocyanate, benzene-1,3,5-triisocyanate, tolylene diisocyanate, tolylene-2,4,6-triisocyanate, ethylbenzene-2,4,6-triisocyanate, monochlorobenzene - 2,4,6-triisocyanate, triphenylmethane-4,4',4''-triisocyanate, diphenyl-2,4,4'-triisocyanate, tolylene-2,4-diisocyanate, tolylene-2,6-diisocyanate, diphenylmethane-4,4'-diisocyanate, 3,3'-dimethyl diisocyanatobiphenyl, 2,3,5,6-tetramethyl-p-phenylene diisocyanate, o-, m- and p-xylene diisocyanates, 4,4'-biphenylene diisocyanate, p,p'-bibenzyl diisocyanate, 4,4'-methylene bis-(o-tolyl diisocyanate), 1,5-naphthyl diisocyanate, polymethylene polyphenylisocyanate, and the like (see Siefken-Annalen 562, pp. 127–135 (1949)). The polyisocyanates have various reactivities, some being much slower than others.

The amount of polyisocyanate used is an amount such that the number of free reactive isocyanato groups is substantially equal to the number of hydroxyl groups in the alcohol mixture of polyol and hydroxyalkylated phosphorylated petroleum hydrocarbon-insoluble pine wood resin. In general, the amount is such that about 0.7 to 1.1 isocyanato groups are available per reactive hydrogen in said polyol mixture.

The foaming agent that is used in the preparation of these foams may be any carbon dioxide generating reagent, including water, which on reaction with the isocyanate produces carbon dioxide, or any nitrogen producing reagent which produces nitrogen at the temperature of curing the polyurethane, or any organic solvent which is volatile at the curing temperature. The foaming agents that are particularly desirable are low-boiling organic solvents which become gaseous at the curing temperature, and these include trichloromonofluoromethane, dichlorodifluoromethane, dichlorofluoromethane, trifluorotrichloroethane, 1,1-dichloro - 1 - fluoromethane, 1-chloro - 1,1-difluoro-2,2-dichloroethane, 1,1,1-trifluoro-2-chloro - 2-fluoro-3,3'-difluoro-4,4,4-trifluorobutane, tetrafluorodichloroethane, difluorotetrachloroethane, as well as the chlorinated hydrocarbons such as methylene chloride, chloroform and carbon tetrachloride.

The foaming composition may also include a surfactant such as silicone.

The preparation of the polyurethane foam may be carried out by the "one-shot" process, or by the "quasi-prepolymer" process. In the former, the reagents, including the blowing agent, are mixed in the desired ratio and then foamed. In the latter, a partial reaction is effected between part of the reagents and this is called a quasi-prepolymer. The quasi-prepolymer is usually prepared from all of the polyisocyanate and part of the alcohol mixture of hydroxyalkylated phosphorylated petroleum hydrocarbon-insoluble pine wood resin and polyol. The quasi-prepolymer is then mixed with the remaining alcohol mixture and foaming agent and catalyst and surfactant, when used, and foamed in a suitable mold or shaped container. The cross-linking need not be completed at once, but may be continued while the foam is in the expanded state. By this process, rigid, semi-rigid or flexible foams may be produced, depending on the reagents used.

If desired, a catalyst can be used to accelerate the urethane formation. Suitable catalysts include tetramethylene diamine, trimethylamine, n-methyl morpholine, n-ethyl morpholine, triethanolamine, tetramethylbutanediamine, triethylenediamine, triethylamine, stannous octoate, dibutyltin dilaurate, and ferric acetyl acetonate. Other catalysts known in the polyurethan foam art may also be used.

The foaming process is carried out by heating at a temperature in the range of about 25° C. to about 100° C. to effect foaming and curing. The temperature of foaming is selected to suit the foaming agent used, as well as the reactivity of the reagents.

Another important use of the hydroxyalkylated phosphorylated petroleum hydrocarbon-insoluble pine wood resins of the invention is in the preparation of flame-retardant urethane coatings. These can be prepared from the same formulations used in the preparation of the polyurethane foams except that no blowing agent is added. Also a low boiling solvent, e.g., tetrahydrofuran, methyl ethyl ketone, methyl isobutyl ketone, or the like can be used to facilitate mixing and application.

Having described the invention, the following examples are given to illustrate specific embodiments thereof. The petroleum hydrocarbon-insoluble pine wood resin utilized in the examples had the following characteristics: average molecular weight about 450, acid number about 95 and active hydrogen content, calculated as hydroxyl and corrected for acid number, about 5–6%.

*Example 1*

Two hundred grams of petroleum hydrocarbon-insoluble pine wood resin and 600 ml. toluene were mixed and heated to reflux until no more water separated. Then 35 g. of phosphoric anhydride ($P_2O_5$) was added in several portions. The reaction mixture was refluxed for 4 hours and then allowed to settle and cool to room tempera. Then the toluene solution was decanted from the resin which had precipitated. On stripping, 109.1 g. of nonreactive petroleum hydrocarbon-insoluble pine wood resin was obtained. It analyzed as follows: 1.1% P; acid No. 100.1; 7.00% active H (calcd. as —OH) and 0.06% $H_2O$.

The toluene-insoluble resin was milled in a Waring Blendor with 200 ml. of distilled water. The resulting suspension was filtered. The filtrate containing all the unreacted $P_2O_5$ as $H_3PO_4$ was discarded. The solids were dried in vacuo. One hundred and nine-tenths grams of brown solid, which analyzed as follows, was obtained:

6.2% phosphorus, acid No. 239; 9.7% active H (as —OH) and 0.35% H$_2$O.

One hundred grams of the above product was suspended in 300 ml. toluene. With stirring and heating to 95–100° C. propylene oxide was introduced until absorption ceased. During this time, the recation mixture became practically homogeneous. Then the toluene and the unreacted propylene oxide were removed under reduced pressure. The product weighed 125.7 g. and was a dark, heavy oil having the following analysis: 4.8% P; acid No. 35; 13.7% active H (as —OH).

*Example 2*

One thousand grams of petroleum hydrocarbon insoluble pine wood resin and 3000 ml. toluene were mixed and heated to reflux until no more water separated. The mixture was then allowed to cool to room temperature and 100 g. P$_2$O$_5$ was added while stirring vigorously. After stirring at room temperature for 16 hours, the reaction mixture was heated to reflux for 6 hours. Then again the reaction mixture was allowed to cool to room temperature and settle. Then the toluene solution was decanted from the insoluble resin. From the toluene solution, 728.0 g. nonreactive petroleum hydrocarbon-insoluble pine wood resin was recovered. To the insoluble resin was added 3000 ml. toluene. The mixture was heated to refluxe with stirring and 410.0 ml. propylene oxide was added over 9 hours. Then the reaction mixture was stripped. Six hundred fifty-one grams of brown heavy oil, which analyzed as follows, was obtained as the product: 6.2% P; acid No. 76; 12.9% active H (as —OH); 0.7% H$_2$O.

*Example 3*

One thousand grams of petroleum hydrocarbon-insoluble pine wood resin and 3000 ml. toluene were mixed and heated to reflux until no more water separated. Then 175 g. P$_2$O$_5$ was added in several portions. The reaction mixture was refluxed for 6 hours and then allowed to cool to room temperature. After the toluene-insoluble material had settled, the toluene solution was decanted and stripped. Five hundred eighty and seven-tenths grams of nonreactive petroleum hydrocarbon-insoluble pine wood resin was recovered. The toluene-insoluble resin then was milled in several portions with a total of 1000 ml. distilled water. The resulting suspension was filtered. The aqueous solution, which contained the excess P$_2$O$_5$ as H$_3$PO$_4$, was discarded. The solids were dried in vacuo. Five hundred fifty-five and six-tenths grams of brown solid was obtained having the following analysis: 6.5% P; acid No. 285; 10.3% active H (as —OH); 0.5% H$_2$O.

Five hundred grams of the above solids were placed in an autoclave with 1000 ml. toluene and heated to 140° C. with stirring. Over 4 hours, 180 g. propylene oxide was introduced. Then the pressure was released and the excess propylene oxide and the solvent were removed under reduced pressure. Six hundred forty-seven and eight-tenths grams of dark heavy oil was obtained having the following analysis. 4.9% P; acid No. 2.0; 7.9 % active H (as —OH); 0.35% H$_2$O.

*Example 4*

One hundred grams of petroleum hydrocarbon-insoluble pine wood resin, 50 g. of polyphosphoric acid (83.0% phosphorus anhydride), and 300 ml. toluene were mixed and heated to reflux for 4 hours with vigorous stirring. Then the reaction mixture was allowed to cool to room temperature and to separate. The clear supernatant was then decanted from the heavy resin which settled out. Another 200 ml. toluene was then added to this resin. The mixture was stirred vigorously for ½ hour, then allowed to separate again. The toluene supernatant was decanted again. The toluene solutions were combined and stripped. Fifty-two and nine-tenths grams of nonreactive petroleum hydrocarbon-insoluble pine wood resin was obtained which analyzed as follows: 0.7% P; 7.35% active H (as —OH); acid No. 69; 0.16% H$_2$O. The toluene-insoluble resin was milled with 100 ml. distilled water in a Waring Blendor for ½ hour. Then the solids were isolated by filtration. Forty-nine and six-tenths grams of phosphorylated petroleum hydrocarbon-insoluble pine wood resin, which analyzed as follows, was obtained: 5.3% P; acid No. 230; 6.9% active H (as —OH); 0.12% H$_2$O.

Forty-five grams of the above product was mixed with 200 ml. toluene and heated to 110° C. Then 30 g. of propylene oxide was added over 1½ hours. The heating was continued for another 2 hours. Then the excess propylene oxide and the toluene were removed by stripping. Fifty-five and one-tenth grams of heavy dark oil, which analyzed as follows was obtained as the product: 4.3% P; acid No. 48; 6.1% active H (as —OH); 0.08% H$_2$O.

*Example 5*

One hundred and thirty-three grams of 85% phosphoric acid was heated to 270° C. for one hour. During this time, 30 ml. of water were collected in a receiver. The syrupy residue (pyrophosphoric acid) was allowed to cool to 150° C. and 150 g. of petroleum hydrocarbon-insoluble pine wood resin was added. The reaction mixture was stirred at 150° C. for one hour. The crude product was washed three times with 100 ml. distilled water each. The solids weighed 183.5 g. and analyzed as follows: 6.1% P; acid No. 226; hydroxyl No. 94.

One hundred grams of the above product was mixed with 300 ml. toluene and heated to 110° C. Over 2 hours, 30 g. propylene oxide was introduced with stirring. Then the mixture was refluxed for another 2 hours. Then the unreacted propylene oxide and the toluene were removed under reduced pressure. One hundred eighteen and two-tenths grams of heavy oil, which analyzed as follows, was obtained as the product: 5.3% P; acid No. 45; 7.8% active H (as —OH); 0.27% H$_2$O.

*Example 6*

Sixteen hundred grams of petroleum hydrocarbon-insoluble pine wood resin was charged into an autoclave and heated to 170° C with stirring. Over 2 hours, 450 g. ethylene oxide was pumped in. Then the reaction mixture was kept at 165–170° for another 4 hours until the pressure leveled off. The unreacted ethylene oxide was removed by sparging with nitrogen. The product, 1948.0 grams of a heavy, dark oil, which analyzed as follows, was taken as a residue: acid No. nil; 8.22% active H (calcd. as —OH); 0.48% H$_2$O.

Six hundred grams of hydroxyethylated petroleum hydrocarbon-insoluble pine wood resin, produced as above described, and 1200 ml. toluene were mixed and heated to reflux until no more water separated. Then the reaction mixture was cooled to 80° C. and 130 g. polyphosphoric acid (Virginia-Carolina Chemical Co., 83.0% phosphorus anhydride) was added over ½ hour. The reaction mixture was refluxed for 4 hours. Then the solvent was removed by stripping. Seven hundred twenty-five and seven-tenths grams of dark resin, which analyzed as follows, was obtained as a product: 6.0% P; acid No. 157.2; hydroxyl No. 114; 0.86% H$_2$O.

Four hundred and thirty-five grams of the above phosphorylated hydroxyethylated petroleum hydrocarbon-insoluble pine wood resin was stirred with 1000 ml. toluene. Over 7 hours at 95° C., 300 g. propylene oxide was introduced. Then the unreacted propylene oxide and the toluene were removed under reduced pressure. Six hundred fifteen and seven-tenths grams of dark resin, which analyzed as follows, was obtained as the product: 4.5% P; acid No. 23.8; 10.3% active H (as —OH); 0.64% H$_2$O.

*Example 7*

Six hundred and ten grams of the hydroxyethylated petroleum hydrocarbon-insoluble pine wood resin, prepared as in Example 6, and 1200 ml. toluene were mixed, stirred, and heated to reflux until no more water separated.

Then 115 g. phosphorus pentoxide was added in small portions over ½ hour. The reaction mixture was kept refluxing for an additional 4 hours. Then the solvent was removed under reduced pressure. The product was 721.5 g. of a dark resin which analyzed as follows: 7.7% P; acid No. 174.1; 0.13% $H_2O$; hydroxyl No. 160.

Four hundred and forty-five grams of the above product was mixed with 2000 ml. toluene. The reaction mixture was heated to 95° C. and over 6 hours, 125 g. propylene oxide was added. Then the excess propylene oxide and the toluene were stripped. The product was 517.6 g. of a dark, heavy oil which analyzed as follows: 6.3% P; acid No. 48.9; 0.06% $H_2O$; 7.13% active H (as —OH).

*Example 8*

One thousand grams of petroleum hydrocarbon-insoluble pine wood resin and 3000 ml. toluene were placed in an autoclave. The mixture was heated to reflux until no more water separated. Then the reaction mixture was heated to 160° C. under pressure and 300 g. ethylene oxide was introduced over one hour. The reaction mixture was kept at 160° C. for another 4 hours. Then the temperature was lowered to 80° C. and the unreacted ethylene oxide was blown off with nitrogen. Then at 80° C., 180 g. phosphorus pentoxide was added with vigorous stirring. Then the temperature was raised to 110° C. for 2 hours. Finally, the temperature was raised to 160° C. again and 150 g. ethylene oxide was introduced over 2 hours. Then the excess ethylene oxide and the toluene were removed under reduced pressure. The product was taken as a residue. It was 1539.7 g. of a heavy, dark oil which analyzed as follows: 4.9% P; acid No. nil; hydroxyl No. 237.

*Example 9*

One half-gram of hydroxypropylated petroleum hydrocarbon-insoluble pine wood resin phosphate, prepared as in Example 2, was dissolved in 10 ml. tetrahydrofuran. To this solution was added 0.24 ml. toluene diisocyanate. A film was cast and allowed to cure at room temperature for 64 hours. A hard, brown film was obtained. The film burned slowly when held over a flame but was self-extinguishing when the external flame source was removed.

*Example 10*

Twenty-two grams of hydroxyethylated substantially petroleum hydrocarbon-insoluble pine wood resin phosphate, prepared as in Example 2, was heated and 7.0 g. Quadrol [N,N,N',N' - tetrakis(hydroxypropyl)ethylendiamine] was added. The mixture was stirred in a Waring Blendor until it was homogeneous. Then 21.0 g. of this mixture was blended with 21.2 g. toluene diisocyanate (Du Pont "Hylene") and 6 drops of silicone oil (Dow 200) until a homogeneous solution was obtained. Then 0.6 ml. distilled water containing 100 mg. triethylenediamine was added. The reaction mixture was stirred until foaming started, then the stirrer was removed and the mixture was allowed to foam. The foam was cured at room temperature for 24 hours. A hard foam was obtained, which burned slowly while exposed to a flame but was self-extinguishing after the flame was removed.

*Example 11*

A quasi-prepolymer with a calculated NCO/OH (isocyanato groups to hydroxyl groups) of 4.50 was prepared by stirring 23.3 parts of a mixture containing 60 weight percent Sorbitol G–2410 (1:10 sorbitol:propylene oxide adduct from Atlas Chemical Industries, Inc., hydroxyl No. 480–500) and 40 weight percent hydroxypropylated phosphorylated petroleum hydrocarbon-insoluble pine wood resin, prepared as in Example 2, with 55.4 parts of tolylene diisocyanate (referred to hereafter as TDI) for one hour. When the quasi-prepolymer cooled to room temperature, it was added all at once to a mixture of 76.7 parts of the same 60/40 blend sorbitol G–2410/hydroxypropylated phosphorylated petroleum hydrocarbon-insoluble pine wood resin mentioned above, 30 parts of trichlorofluoromethane, 1 part tertamethylbutane-diamine, 0.6 part stannous octoate, and 2 parts Dow Corning 113 silicone fluid. The final mixture was stirred immediately for 5 seconds at 2400 r.p.m. on a laboratory stirrer and the liquid poured into a cardboard container, where it expanded to a rigid foam. Foam density was 5.8 lb./cu. ft.; compressive strength (10% deflection) was 12 p.s.i. The foam was self-extinguishing with an extent of burning of one inch. The foam burned with molten drip. Analysis of the foam showed that it contained 1.5% phosphorus.

*Example 12*

A quasi-prepolymer with a calculated NCO/OH of 4.50 was prepared by stirring 23.3 parts of a mixture containing 70 weight percent sorbitol G–2410 and 30 weight percent hydroxypropylated phosphorylated petroleum hydrocarbon-insoluble pine wood resin, prepared as in Example 2, with 66.5 parts of TDI for one hour. When the quasi-prepolymer cooled to room temperature, it was added all at once to a mixture of 76.7 parts of the same 70/30 blend of sorbitol G–2410/hydroxypropylated phosphorylated petroleum hydrocarbon-insoluble pine wood resin mentioned above, 30 parts of trichlorofluoromethane, 1 part tetramethylbutanediamine, 0.3 part stannous octoate, and 1 part L–520 silicone fluid. The final mixture was stirred immediately for 5 seconds at 2400 r.p.m. on a laboratory stirrer and the liquid poured into a cardboard container where it expanded to a rigid foam. Foam density was 2.1 lb./cu. ft.; compressive strength (10% deflection) was 17 p.s.i.; tensile strength was 27 p.s.i.; K-factor was 0.161. The foam was self-extinguishing with an extent of burning of one inch. This foam burned with no drip and analyzed to contain 1.7% phosphorus.

*Example 13*

One hundred parts of a mixture containing 70 weight percent sorbitol G–2410 and 30 weight percent hydroxypropylated phosphorylated petroleum hydrocarbon-insoluble pine wood resin, prepared as in Example 2, 30 parts of trichlorofluoromethane (Freon 11, Du Pont), 0.8 part tetramethylbutane-diamine (Union Carbide Chemicals), 0.3 part stannous octoate (Catalyst T–9; M/T Chemicals Inc.), and 1 part Dow Corning 113 silicone fluid were blended together. A weighed quantity (106.1 parts) of crude methylenebis(4-phenylisocyanate) (Mobay's Mondur MR) was added all at once and the final mixture stirred immediately for 10 seconds at 2400 r.p.m. on a laboratory stirrer. The liquid was poured into cardboard container where it expanded to a rigid foam. Foam density was 2.4 lb./cu. ft.; compressive strength (10% deflection) was 36 p.s.i.; tensile strength was 43 p.s.i.; K-factor was 0.137. The foam was self-extinguishing with an extent of burning of ⅝ inch. The foam burned with no drip and analyzed to contain 1.2% phosphorus.

*Example 14*

A quasi-prepolymer with a calculated NCO/OH of 4.50 was prepared by stirring 23.3 parts of a mixture containing 70 weight percent Voranol RS–410 (1:14 sucrose:propylene oxide abduct from Dow Chemical Company) and 30 weight percent hydroxypropylated phosphorylated petroleum hydrocarbon-insoluble pine wood resin, prepared as in Example 2, with 67 parts of TDI for one hour. When the quasi-prepolymer cooled to room temperature, it was added all at once to a mixture of 76.7 parts of the same 70/30 blend of Voranol RS–410/hydroxypropylated phosphorylated petroleum hydrocarbon-insoluble pine wood resin mentioned above, 30 parts of trichlorofluoromethane, 0.8 part triethylenediamine (DABCO from Houdry Process and Chemical Company), and one part Dow Corning 113 silicone fluid. The final mixture was stirred immediately for eight seconds at 2400 r.p.m. on a laboratory stirrer and the liquid poured into a cardboard container, where it expanded to a rigid foam. Foam density was 2.0 lb./cu. ft.; compressive strength (10% deflection) was 22 p.s.i.; tensile strength was 11 p.s.i.; K-factor was 0.190. The foam was self-extinguishing with an extent of burning of 1%6 inch. The foam burned with no drip and analyzed to contain 1.7% phosphorus.

*Example 15*

A quasi-prepolymer with a calculated NCO/OH of 4.50 was prepared by stirring 23.3 parts of a mixture containing 60 weight percent Voranol RS–410 and 40 weight percent hydroxypropylated phosphorylated petroleum hydrocarbon insoluble pine wood resin, prepared as in Example 2, with 59.3 parts TDI for one hour. When the quasi-prepolymer cooled to room temperature, it was added all at once to a mixture of 76.7 parts of the same 60/40 blend of Voranol RS–410/hydroxypropylated phosphorylated petroleum hydrocarbon-insoluble pine wood resin mentioned above, 30 parts of trichlorofluoromethane, 0.5 part triethylenediamine, and one part Dow Corning 113 silicone fluid. The final mixture was stirred immediately for eight seconds at 2400 r.p.m. on a laboratory stirrer and the liquid poured into a cardboard container, where it expanded to a rigid foam. Foam density was 5.8 lb./cu. ft. This foam was self-extinguishing with an extent of burning of 1%6 inch. The foam burned with no drip and analyzed to contain 1.4% phosphorus.

*Example 16*

A quasi-prepolymer with a calculated NCO/OH of 4.50 was prepared by stirring 23.4 parts of a mixture containing 50 weight percent sorbitol G–2410 and 50 weight percent hydroxypropylated phosphorylated hydroxyethylated petroleum hydrocarbon-insoluble pine wood resin, prepared as in Example 6, with 62.7 parts of TDI for one hour. When the quasi-prepolymer cooled to room temperature, it was added all at once to a mixture of 76.6 parts of the same 50/50 blend of sorbitol G–2410/hydroxypropylated phosphorylated hydroxyethylated petroleum hydrocarbon-insoluble pine wood resin mentioned above, 25 parts of trichlorofluoromethane, 1.0 part tetramethylbutane diamine, 0.2 part stannous octoate and 1 part L–530 silicone fluid (Union Carbide Silicone Division). The final mixture was stirred immediately for five seconds at 2400 r.p.m. on a laboratory stirrer and the liquid poured into a cardboard container where it expanded to a rigid foam. Foam density was 2.3 lb./cu. ft.; compressive strength (10% deflection) was 34 p.s.i.; tensile strength was 29 p.s.i.; K-factor was 0.192. The foam was flame-retardant with a rate of burning of 3.40 in./min. The foam burned with molten drip. A foam of 2.1 lb./cu. ft. density prepared in the same way, but in which the polyol was exclusively sorbitol G–2410, burned at a rate of 3.92 in./min. The experimental foam analyzed to contain 1.4% phosphorus.

*Example 17*

A quasi-prepolymer with a calculated NCO/OH of 4.50 was prepared by stirring 23.3 parts of a mixture containing 50 weight percent sorbitol G–2410 and 50 weight percent of hydroxypropylated phosphorylated hydroxyethylated petroleum hydrocarbon-insoluble pine wood resin, prepared as in Example 6, with 61.5 parts TDI for one hour. When the quasi-prepolymer cooled to room temperature, it was added all at once to a mixture of 76.7 parts of the same 50/50 blend of sorbitol G–2410/hydroxypropylated phosphorylated hydroxyethylated petroleum hydrocarbon-insoluble pine wood resin mentioned above, 25 parts of trichlorofluoromethane, 1.0 part tetramethylbutanediamine, 0.2 part stannous octoate and 1.0 part L–530 silicone fluid. The final mixture was stirred immediately for 5 seconds at 2400 r.p.m. on a laboratory stirrer and the liquid pored into a cardboard container, where it expanded to a rigid foam. Foam density was 2.4 lb./cu. ft.; compressive strength (10% deflection) was 35 p.s.i.; tensile strength was 41 p.s.i.; K-factor was 0.169. The foam was flame-retardant with a rate of burning of 3.36 in./min. The foam burned with molten drip and analyzed to contain 1.7% phosphorus.

*Example 18*

A quasi-prepolymer with a calculated NCO/OH of 4.50 was prepared by stirring 23.3 parts of a mixture containing 60 weight percent sorbitol G–2410 in 40 weight percent hydroxypropylated phosphorylated hydroxyethylated petroleum hydrocarbon-insoluble pine wood resin, prepared as in Example 7, with 58.3 parts TDI for one hour. When the quasi-prepolymer cooled to room temperature, it was added all at once to a mixture of 76.7 parts of the same 60/40 blend of sorbitol G–2410/hydroxypropylated phosphorylated hydroxyethylated petroleum hydrocarbon-insoluble pine wood resin mentioned above, 25 parts of trichlorofluoromethane, 1.0 part tetramethylbutanediamine, 0.1 part stannous octoate, and 1.0 part L–530 silicone fluid. The final mixture was stirred immediately for five seconds at 2400 r.p.m. on a laboratory stirrer and the liquid poured into a cardboard container where it expanded to a rigid foam. Foam density was 2.2 lb./cu. ft.; compressive strength (10% deflection) was 18 p.s.i.; tensile strength 37 p.s.i.; K-factor was 0.139. The foam was flame-retardant with a rate of burning of 2.90 in./min. The foam burned with molten drip and analyzed to contain 1.4% phosphorus.

*Example 19*

A quasi-prepolymer with a calculated NCO/OH of 4.50 was prepared by stirring 23.3 parts of a mixture containing 60 weight percent of sorbitol G–2410 and 40 weight percent of hydroxypropylated phosphorylated hydroxyethylated petroleum hydrocarbon - insoluble pine wood resin, prepared as in Example 7, with 61.7 parts TDI for one hour. When the quasi-prepolymer cooled to room temperature, it was added all at once to a mixture of 76.7 parts of the same 60/40 blend of sorbitol G–2410/hydroxypropylated phosphorylated hydroxyethylated petroleum hydrocarbon-insoluble pine wood resin mentioned above, 25 parts of trichlorofluoromethane, 1.0 part tetramethylbutanediamine, 0.1 part stannous octoate, and 1.0 part L–530 silicone fluid. The final mixture was stirred immediately for five seconds at 2400 r.p.m. on a laboratory stirrer and the liquid poured into a cardboard container where it expanded to a rigid foam. Foam density was 2.1 lb./cu. ft.; compressive strength (10% deflection) was 27 p.s.i.; tensile strength was 30 p.s.i.; K-factor was 0.161. The foam was flame-retardant to self-extinguishing in separate measurements on the same foam using the same test method. The foam burned with molten drip at 2.92 in./min. and the foam was self-extinguishing with an extent of burning of 3 inches. The foam analyzed to contain 1.4% phosphorus.

It will thus be seen that the phosphorus-containing compositions of the invention are highly useful in the preparation of polyurethane films and foams and that these compositions impart to such products flame-retardant properties. These compositions, moreover, can be used to replace a portion or all of the more expensive polyols used in the preparation of such products, thus making for greater economy.

What I claim and desire to protect by Letters Patent is:

1. The process of preparing a composition useful in the preparation of flame-retardant urethane foams and coating compositions which comprises
    (A) reacting
        (1) a material selected from the group consisting of
            (a) a substantially petroleum hydrocarbon-insoluble pine wood resin, and
            (b) a hydroxyalkylated substantially petroleum hydrocarbon-insoluble pine wood resin
        with
        (2) a material selected from the group consisting of (a) polyphosphoric acid, and
(b) phosphoric anhydride, the ratio of material (1) to material (2) being, by weight, from about 20:1 to about 2:1, and (B) reacting the resulting reaction product with an epoxide having the formula

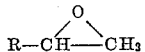

wherein R is selected from the group consisting of hydrogen, alkyl, chloroalkyl, bromoalkyl, aryl, chloroaryl, and bromoaryl at temperatures of from about 80° C. to 160° C. for a period of time from about ½ hour to about 6 hours until there is produced a product that is substantially neutral.

2. The process of claim 1 in which the material (1) is a substantially petroleum hydrocarbon-insoluble pine wood resin.

3. The process of claim 1 in which the material (1) is a hydroxyalkylated substantially petroleum hydrocarbon-insoluble pine wood resin.

4. The composition prepared in accordance with the process of claim 1.

5. A process of preparing a flame-retardant urethane which comprises reacting the composition of claim 4 with an organic polyisocyanate.

6. The process of claim 5 in which the amount of polyisocyanate is such that about 0.7 to about 1.1 isocyanato groups are available per reactive hydrogen in said mixture.

7. The method of preparing a polyurethane foam which comprises reacting a mixture of (1) a blend of (a) a polyol of the group consisting of polyesters and polyethers having an average of at least two hydroxyl groups per molecule and (b) the composition of claim 4, said blend having a hydroxyl number in the range of about 40 to about 650, (2) an organic polyisocyanate in amount such that about 0.7 to about 1.1 isocyanato groups are available per reactive hydrogen in said mixture, and (3) a blowing agent.

References Cited

UNITED STATES PATENTS 2,555,901   6/1951   Rummelsburg _____ 260—104

FOREIGN PATENTS 996,523   6/1965   Great Britain.

DONALD E. CZAJA, *Primary Examiner.*

LEON J. BERCOVITZ, *Examiner.*

H. E. TAYLOR, J. J. KLOCKO, *Assistant Examiners.*

UNITED STATES PATENT OFFICE
CERTIFICATE OF CORRECTION

Patent No. 3,345,310　　　　　　　　　　　　　　October 3, 1967

Karl Brack

It is hereby certified that error appears in the above numbered patent requiring correction and that the said Letters Patent should read as corrected below.

Column 5, lines 52 to 61, for that portion of the formula under "Noncatalytic" reading $\overset{|}{R}$ read $\overset{|}{R_1}$ column 8, line 35, for "polyurethan" read -- polyurethane --; column 9, line 6, for "recation" read -- reaction --; line 27, for "refluxe" read -- reflux --; column 12, line 2, for "tertamethylbutane" read -- tetramethylbutane --.

Signed and sealed this 1st day of October 1968.

(SEAL)
Attest:

Edward M. Fletcher, Jr.　　　　　　　　　　　　EDWARD J. BRENNER
Attesting Officer　　　　　　　　　　　　　　　Commissioner of Patents